June 1, 1965   J. F. FLOOD ETAL   3,187,323
AUTOMATIC SCALER FOR ANALOG-TO-DIGITAL CONVERTER
Filed Oct. 24, 1961                               4 Sheets-Sheet 1

INVENTORS
JOHN F. FLOOD
FRANK L. ROSEN
BY
ATTORNEY

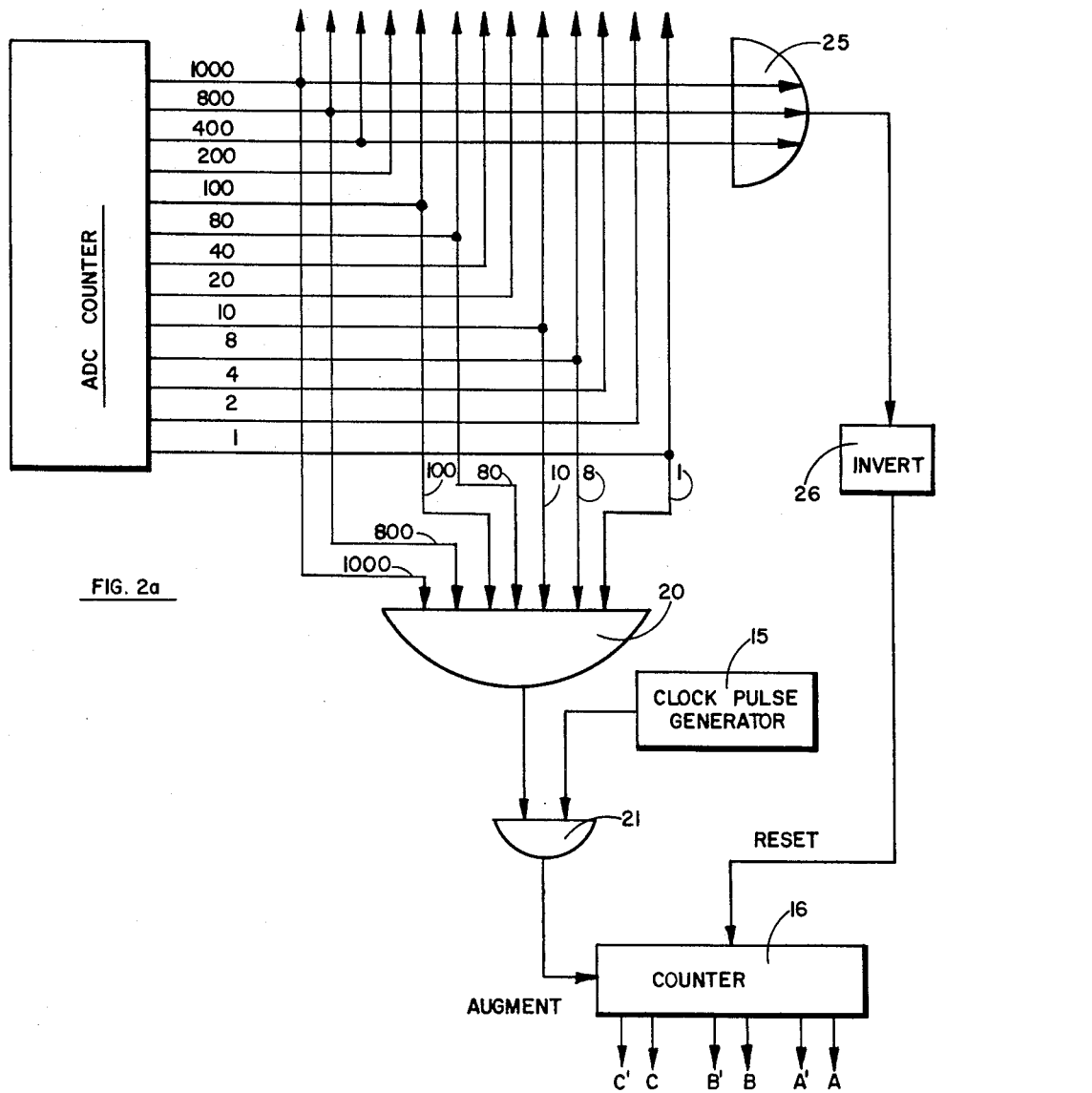

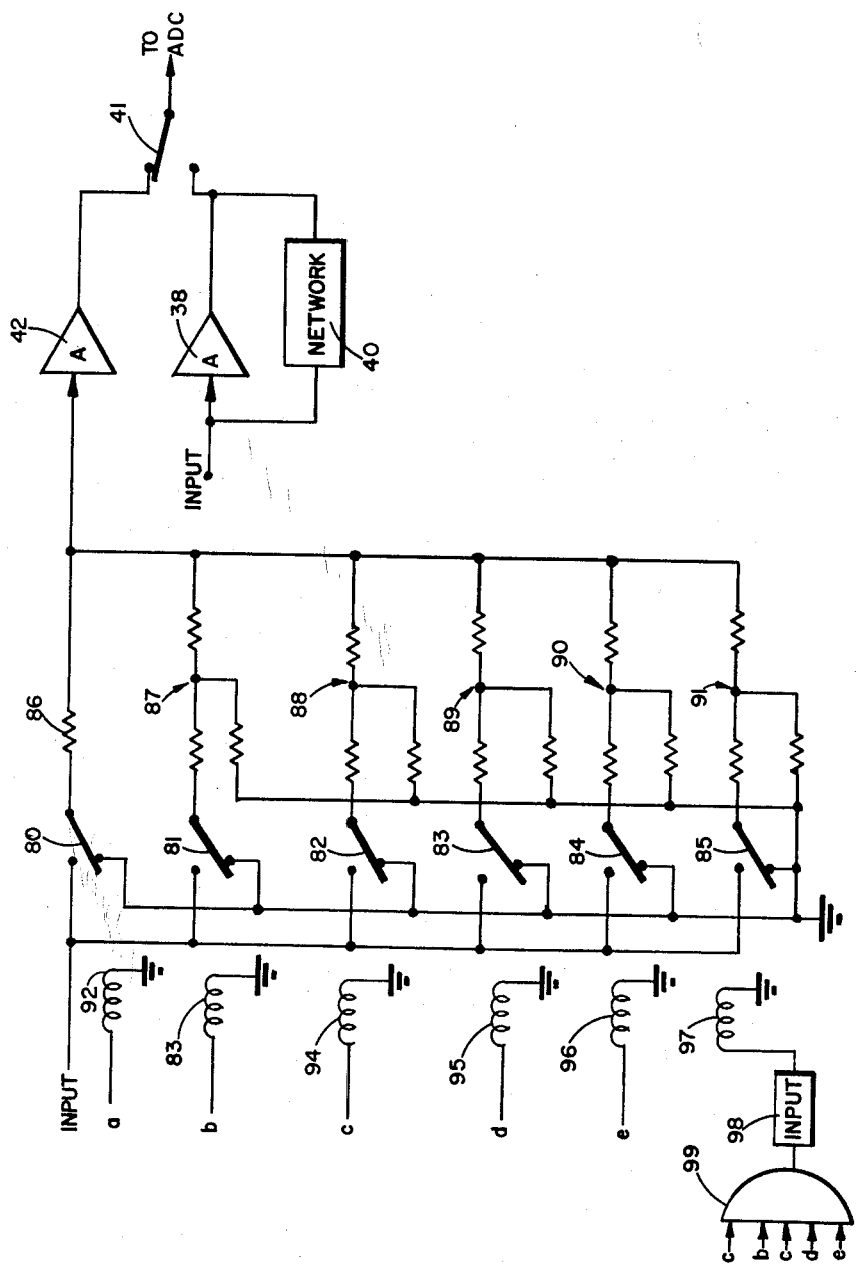

3,187,323
AUTOMATIC SCALER FOR ANALOG-TO-DIGITAL CONVERTER
John F. Flood and Frank L. Rosen, Anaheim, Calif., assignors to North American Aviation, Inc.
Filed Oct. 24, 1961, Ser. No. 147,252
10 Claims. (Cl. 340—347)

This invention relates to the scaling of measuring apparatus and more particularly concerns the automatic choice of proper scale for an analog-to-digital converter which is utilized to measure conditions or values represented by electrical analog signals.

Digital measurements of component values, conditions, or the like, are generally made by obtaining an analog electrical representation of the desired condition or value and then coverting this analog signal to digital form. It is desirable to use the analog-to-digital converter with a number of different inputs representing different conditions or different types of measurements having a wide range of variation of magnitudes. At the same time it is desired to use the entire capacity of the analog-to-digital converter in order to obtain maximum sensitivity and resolution of the measurement. To this end a number of different scales are generally employed in a measuring instrument. Manual control of scales of a measuring instrument is, of course, relatively slow and subject to human error. Further, a rapid change to a higher scale is often required in order to protect the measuring instrument in the presence of inputs of greater value than can be handled by an originally chosen scale.

Accordingly, it is an object of this invention to provide a measuring instrument which will automatically and rapidly select the optimum scale in accordance with the magnitude of the input signal.

To achieve this object, the principles of the present invention are carried out, according to a preferred embodiment, by providing an analog-to-digital converter with means for changing the converter scale. There is also provided means for sensing when the output of the analog-to-digital converter has a given relation to a predetermined digital value. More particularly there are provided means to detect a predetermined maximum output of the converter and also a predetermined minimum converter output. In response to the sensing means, apparatus is provided to effect discrete changes of the converter scale of like sense for each of a plurality of successive maximum outputs of the analog-to-digital converter. In other words, when the converter output reaches or approaches its maximum value, the structure is arranged to change the converter scale to the next higher scale. If the sensing means again detects a maximum coverter output, the scale is again changed to the next higher scale. This operation continues through the entire range of available scales which may be five or six in an exemplary measuring instrument. Should the input be removed or should the input analog signal drop below a predetermined minimum value whereby but a small fraction of the converter capacity is being utilized, the minimum detecting apparatus will provide a signal which, in the exemplary embodiment, will effect a change of scale to the very lowest available. It will be readily appreciated, nevertheless, that if desired, the change of scale toward lower scales can be achiever scale by scale and step by step just as is the change of scale toward higher scale.

In the described embodiment, there is a scale changer coupled between the input to be converted and the input to the analog-to-digital converter. The scale changer may comprise an operational amplifier with a discretely variable gain or an operational amplifier together with a discretely variable attenuator. If desired, different amplifiers and different types of scale changing may be switched into the apparatus in order to optimumly handle signals of different types. There is provided an overflow detector and a minimum detector. A coincidence gate receives the output of the clock pulse generator together with the output of the overflow detector and feeds a number of clocked pulses to a counter which accordingly augments for each overflow detection occuring during a clock pulse. There is provided a scale selector in the form of a logic network which is responsive to different counts of the counter and accordingly operates to select a different scale for different counter outputs. The counter is connected to be reset by the minimum detector whereby the scale of the converter is chosen when the converter output goes to a minimum value.

It is an object of this invention to provide an automatically scaled measuring instrument.

Another object of the invention is to provide an increase in the speed of scale selection.

Still another object of the invention is to provide protection of a measuring instrument by rapid scale selection.

A further object of the invention is to provide rapid automatic scaling of a measuring instrument over a wide range of different scales and different inputs.

These and other objects of the invention will become apparent from the following description taken in connection with the following figures wherein:

FIGS. 2a and 2b illustrate converter output detection and scale selection;

FIG. 4 shows details of another form of scale changer.

In the drawings, like reference characters refer to like parts.

Figure 1:
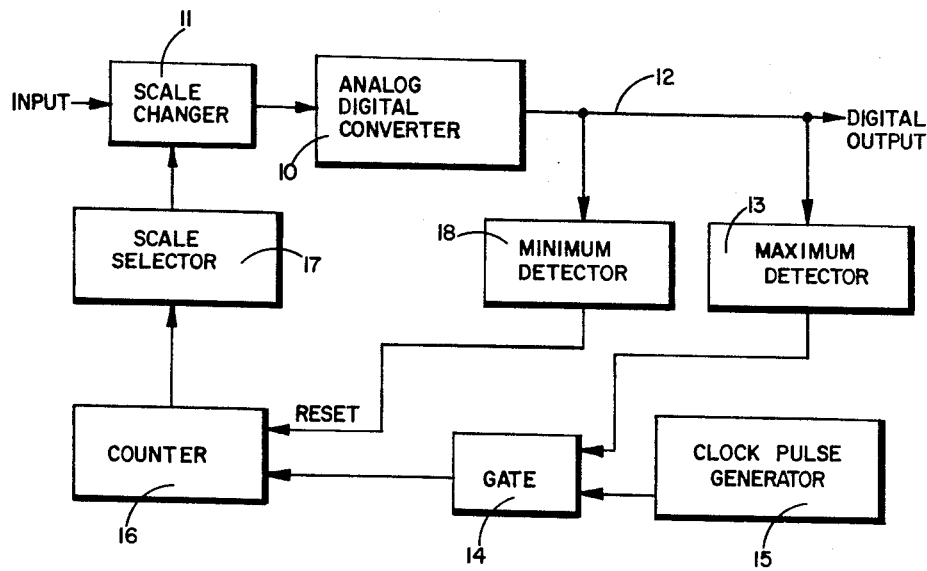
FIG. 1 is a block diagram of a preferred embodiment of the invention.

As is illustrated in FIG. 1, there is provided an analog-to-digital converter 10 receiving an analog input signal from a scale changer 11 which in turn receives an input signal whose value is to be read out in digital form. The converter 10 may be one of many different types well known to those skilled in the art which takes an analog input signal and provides either a series of pulses or a number of parallel digital output lines 12 providing a parallel digital representation of the analog input to the converter. A converter suitable for use in the embodiment of this invention is described in an application, Serial No. 653,455, for High Speed Data Conversion and Handling, filed April 17, 1957, by M. L. Klein et al. Another type of analog-to-digital converter is described in U.S. Patent No. 2,989,741 to B. M. Gordon et al.

By virtue of limitations inherent in the conventional structure of the analog-to-digital converter 10, there is a maximum count available from the converter. Accordingly when such maximum count is provided on the parallel output lines 12 a maximum detector 13 provides an output signal to a coincidence gate 14. There is provided a clock pulse generator 15 such as a free running multivibrator together with suitable pulse-shaping circuitry which provides clock pulses at a rate such as 100 pulses per second, for example, to the gate 14 which is, accordingly, repetitively enabled at the clock rate. If a maximum output of the converter exists during a clock pulse, the gate 14 passes a pulse to a counter 16 which is initially set to a predetermined condition such as zero, for example. The output of the counter is fed to a scale selector 17 comprising a logical network which provides signals to the scale changer 11 to effect operation of the changer to provide a scale chosen by the selector 17.

Should the input be removed from the apparatus or should the input fall below a predetermined value for the existing scale such that the output of the converter 10 is below a predetermined minimum, a minimum detector 18 connected to the parallel digital output lines of the converter will feed a signal to the counter 16 to reset or zero this counter. The scale selector logic 17 is chosen such that zero count of counter 16 will cause the selector 17 to select the lowest scale of scale changer 11. Accordingly, when the apparatus is first energized in the absence of input the minimum detector will operate to zero the counter 16 and select the lowest scale at which all measurements are initiated.

In an embodiment of the invention which is presently in use there are provided six scales for measurement of A.-C. and D.-C. analog signals, scales for 2, 8, 20, 80, 200 and 500 volt maximum inputs respectively. The converter provides a maximum output of decimal 1999 which is the output detected by the maximum detector while the minimum detector detects decimal output 400. Thus a two-volt scale is initially selected by the zero count of counter 16. Should the input to scale changer 11 increase to above two volts, the output of the converter 10, will at some time, become the maximum value 1999 to provide an output from detector 13 which will cause a pulse to be fed to counter 16 upon the next clock pulse from the generator 15. Accordingly, the count of counter 16 will be augmented by one to effect a change of scale to the 8 volt scale which is capable of handling a maximum of 8 volts. If the input signal is greater than 8 volts, the circuit operates again to detect the maximum and feed a pulse through clocked gate 14 to the counter which is further augmented by one whereby the third highest scale, the 20 volt maximum scale, is selected. This operation, a step-by-step selection of the next higher scale, continues until the highest scale, the 500 volt scale, for example, is chosen.

During operation with any of the chosen scales, if the input should be removed or if the input magnitude should fall to a value such that, with the scale in use, the analog digital converter output becomes 400 or less, the minimum detector 18 will feed a reset pulse to the counter which is accordingly zeroed to thereby select the lowest (2 volt) scale.

While the invention is described with the use of apparatus to reset the scale to the very lowest scale upon removal of the input or decrease of the magnitude of the input, it will be readily appreciated that the change of negative sense in the scale, that is the decrease in scale, can be achieved step by step just as there is achieved a step-by-step increase in scale.

Of course, the particular values of the scales chosen and the particular maximum values of converter are variable depending upon the choice of the designer and the applications required of the equipment. Different types of converters will have different maximum outputs and will provide different types of parallel digital outputs whereby different maximums and different minimums will be normally employed for such analog-digital converters as required for a particular situation.

As illustrated in FIG. 2a, one type of conventional converter suitable for use in this invention may have an output counter providing a ones unit having four output lines of decimal values 1, 2, 4, and 8 respectively, a decades unit providing four outputs of decimal values 10, 20, 40, 80, respectively, a hundreds unit providing four outputs of decimal values 100, 200, 400, and 800 respectively, and a thousands unit providing a single output of decimal value 1,000. As previously mentioned the particular details of the analog-to-digital converter or its counter and outputs are of no specific concern in the purposes of this invention. Nevertheless in the example illustrated it is desired that a maximum count of 1999 is to be employed to change the scale to next higher scale value. Accordingly leads respectively connected to outputs of value 1, 80, 100, 800, 100, 800, and 1,000 are connected as inputs to an AND gate 20 which has an output providing the input to a second AND gate 21. The latter has a second input in the form of clock pulses from the pulse generator 15.

There is provided a three stage binary counter employing three flip-flops to provide a straight binary count of augmenting pulses received from the output of AND gate 21. This counter provides true outputs A, B, and C and the inverse or false outputs A', B', and C' with the individual output depending, of course, upon the state of the corresponding counter stage. Thus when all three stages of the counter are zero, the counter outputs A', B', C' are true. When the count is one, the outputs A, B' and C' are true. When the count is 2, the outputs A', B, and C' are true. When the count is three the outputs A, B, and C' are true. When the count is four, the true outputs are A', B', and C. When the count is five, the true outputs are A, B' and C; and when the count is six, the true outputs are A', B, and C. Such counters are of course well-known to those skilled in the art and no further description hereof is believed to be necessary.

For the purposes of providing a minimum detection, the outputs of the analog-to-digital counter of values 400, 800, and 1,000 respectively are fed to an OR gate 25. The output of this OR gate 25 is fed to an inverter 26 which feeds a signal to the counter 16 to reset the counter to zero. For existence of an output of the analog-to-digital counter of less than 400, the output leads of values 400, 800, and 1,000 in the illustrated embodiment must all be false. If any one of these is true, the output is 400 or greater. Accordingly if any one of these outputs is true, the output of OR gate 25 is true and the output of inverter 26 is false whereby no reset signal is sent to the counter 16. On the other hand, if none of the 400, 800, or 1,000 outputs of the analog-to-digital counter is true, the output of OR gate 25 is false whereby the output of inverter 26 is true to provide a reset pulse to zero counter 16.

Figure 2B:
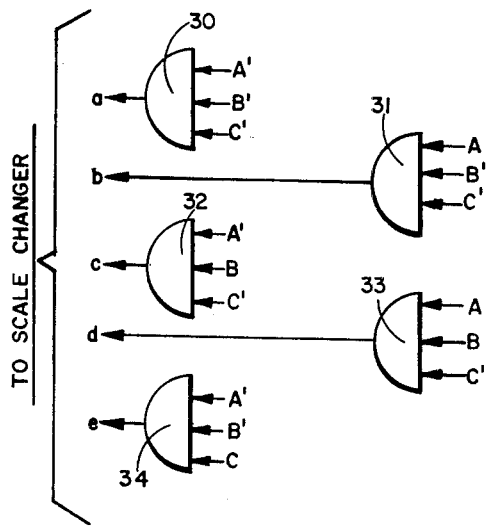

The scale selector logic illustrated in FIG. 2b comprises a number of AND gates responsive to the outputs A, A', B, B', C, C' of the counter 16. These gates, as illustrated in FIG. 2b, comprise AND gates 30, 31, 32, 33, and 34, having the combinations of inputs A, B, C, or A', B', and C' as indicated in the drawing. The outputs of AND gates 30 through 34 are designated as $a$, $b$, $c$, $d$, and $e$, respectively. These outputs $a$ through $e$ respectively correspond to counts of the counter of zero, 1, 2, 3, 4, and 5. Other possible arrangements of scale selector logic will be apparent. It may be noted that the illustrated logic is chosen so as to enable automatic scale selection according to the described signals $a$ through $e$ for use in an apparatus which also provides for manual control of scale by the same $a$ through $e$ code.

Figure 3:
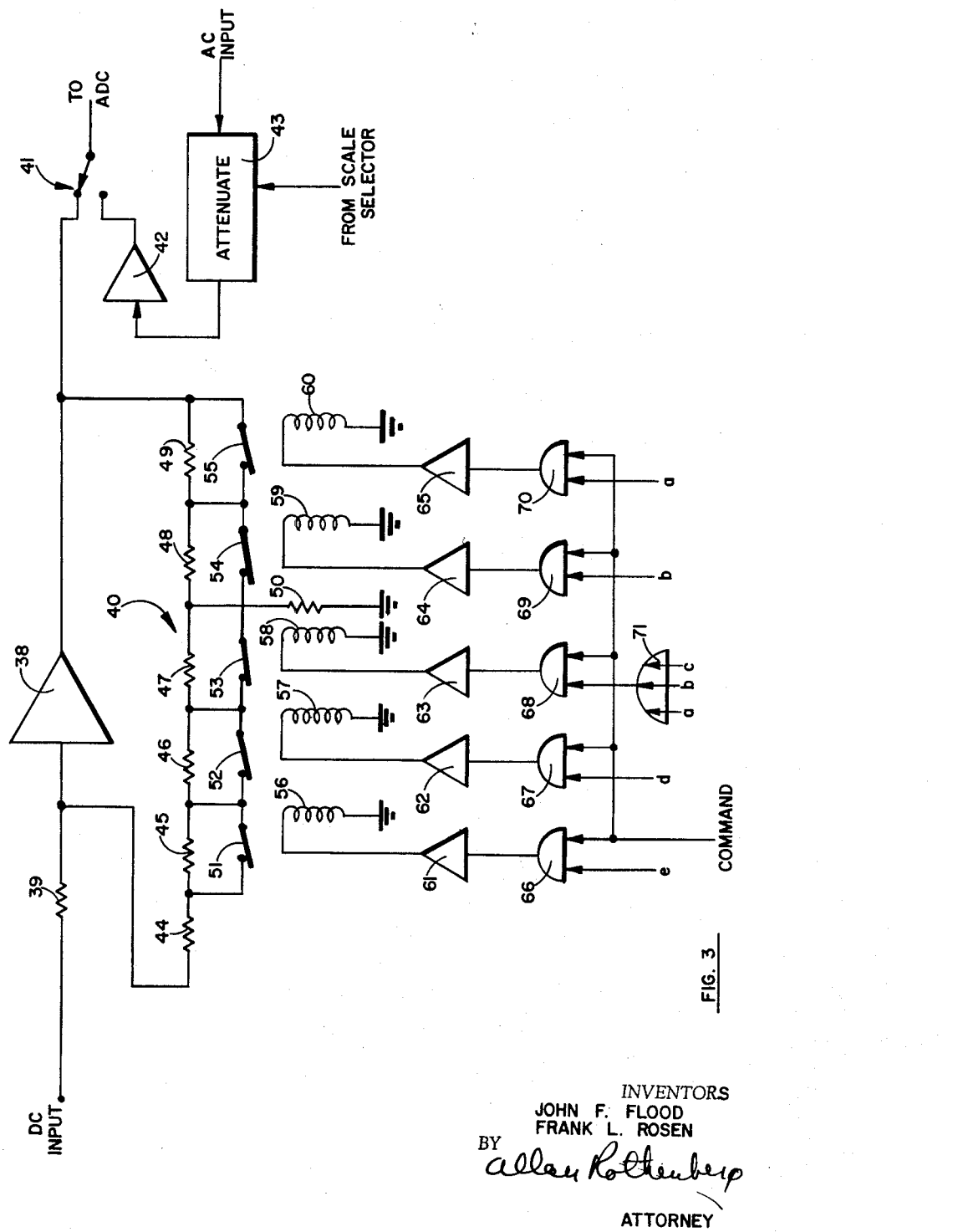
FIG. 3 shows details of one form of scale changer.

As illustrated in FIG. 3, the scale changer comprises a plurality of variable amplifiers which are selectively switched according to the desired condition to be measured. FIG. 3 illustrates two of such amplifiers although, as will be readily understood by those skilled in the art, additional input amplifiers adapted to measure still other conditions may also be employed. For measurement of D.-C. analog signals, there is provided a D.-C. amplifier 38 having an input resistor 39 and a discretely variable gain controlled by a shunted resistive network 40. The output of the D.-C. amplifier 38 is fed via a switch 41 to the input of the analog-to-digital converter 10 as illustrated in FIG. 1.

For making A.-C. measurements there is also provided an A.-C. amplifier 42 having interposed between the signal to be measured and the amplifier input an attenuator network 43 (more particularly described below) for the purposes of effecting a discrete step by step scale change for A.-C. measurements.

The resistive network in the feedback loop of amplifier 38 comprises a number of series connected resistors 44, 45, 46, 47, 48, and 49 having a resistor 50 connected between ground and the junction of resistors 47 and 48 to provide a variable resistive T network. Resistors 45 through 49 respectively are shunted by relay controlled normally closed (when de-energized) switches 51, 52, 53, 54, and 55 respectively. The several switches are driven by respective relay coils 56, 57, 58, 59, and 60 which are in turn driven by driver amplifier 61, 62, 63, 64 and 65 respectively. The amplifiers 61 through 65 receive the outputs of respective AND gates 66, 67, 68, 69 and 70. Each of AND gates 66 through 70 is enabled by a D.-C. command signal which may be derived from a manually-controlled switch (not shown). It will be understood that suitable means (not shown) will operate to throw switch 41 to the position wherein the output of amplifier 38 is connected to the input of the analog-to-digital converter for D.-C. measurement. The second input to each of AND gates 66 through 70 comprises one of the outputs of the scale selector AND gates 30 through 34 as indicated in the drawing. Thus AND gate 70 receives the output $a$ of AND gate 30, gate 69 receives the output $b$ of AND gate 31, the gate 68 receives the output of an OR gate 71 which in turn receives the outputs $a$, $b$, and $c$ of AND gates 30, 31, and 32. AND gate 67 and AND gate 66 respectively receive the outputs $d$ and $e$ of gates 33 and 34.

It will be seen that resistors 44 and 50 are always in the feedback path. Assume a D.-C. command exists. When only $a$ is true, the lowest scale is chosen by having only resistors 44, 50, 47 and 49 in the feedback path. When only $b$ is true, the eight volt scale is chosen by having resistors 44, 50, 47 and 48 in the feedback path. With $c$ true and the other inputs to the scale changer false, only resistors 44, 50 and 47 are in the feedback path. With all inputs but $d$ false, the eighty volt scale is chosen by resistors 44, 50 and 46. With all false but $e$, the 200 volt scale is chosen by resistors 44, 50 and 45. When all of the inputs $a$ through $e$ are false, only resistors 44 and 50 are in the feedback path whereby the 500 volt scale is chosen.

For measurements of A.-C. analog signals, the switch 41 is caused to move to the upper position in FIG. 4 (the lower position in FIG. 3) wherein the A.-C. amplifier 42 has its output connected to the input of the analog-digital converted while the output of D.-C. amplifier 38 is disconnected from the converter. With A.-C. measurements, the scale changing is achieved by a discretely variable attenuation network connected in series between the input to amplifier 42 and the A.-C. analog signals to be measured. The same six scales of 2, 8, 20, 80, 200 and 500 volt maximums may be chosen by operation of six relays operated switches 80, 81, 82, 83, 84, and 85 respectively shown in de-energized position in FIG. 4. Each of the switches, when de-energized, connects the input to amplifier 42 to ground through a resistor 86 or through one of resistive T networks 87, 88, 89, 90, and 91, respectively. Switch 80, when uniquely closed, provides a two volt scale. Switch 81, when closed with all others open, provides an eight volt scale. When switch 82 is uniquely closed, the 20 volt scale is provided. So too, when one of switches 83, 84, and 85 respectively is uniquely closed, the scales of 80 volts, 200 volts and 500 volts are provided.

Switches 80 through 85 respectively are driven by relay coils 92, 93, 94, 95, 96 and 97 respectively. Of these, relay coils 92 through 96 are driven through appropriate driver amplifiers (not shown) by the outputs $a$ through $e$ of gates 30 through 34 of FIG. 2. The maximum scale relay 97 is operated through an inverter 98 and the output of an AND gate 99 which receives all of the inputs $a$ through $e$ inclusive. Accordingly when each of these signals $a$ through $e$ is false, switch 85 is operated.

It will be readily appreciated that the relay coils 93 through 97 may be operated by means of AND gates each enabled by an A.-C. command signal in a manner analogous to the operation of the D.-C. scale changer illustrated in FIG. 3.

It will be seen that there has been described a versatile and rapid-acting automatic scale changing apparatus for use with an analog-to-digital converter which provides for a wide range of application of the converter to measurements of a large number of different types and magnitudes of input conditions. The apparatus provides a step-by-step increase in scale until the appropriate scale is employed and at the same time provides for a rapid switch to lower scale when necessary whereby maximum use of the converter capacity is achieved while providing protection to the converter from rapidly increasing inputs.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination, a scaling means, an analog-to-digital converter, coupled to an analog input signal by said scaling means for selectively scaling the amplitude of said input signal, a maximum digital output detector responsive to the output of the analog-to-digital converter, a repetitively enabled gate responsive to said detector, means connected to said scaling means for effecting successive changes of like sense in the scale of said analog-to-digital converter in response to successive outputs of said gate, a predetermined minimum digital output detector responsive to the output of the analog-to-digital converter, and means connected to said scaling means responsive to said minimum detector for changing the scale of said analog-to-digital converter in a sense opposite to said first mentioned sense.

2. In combination, a scaling means, an analog-to-digital converter coupled to an analog input signal by said scaling means for selectively scaling the amplitude of said input signal, means repetitively operable at successive times for detecting a maximum digital output of said converter, means connected to said scaling means responsive to each successive detection of a maximum digital output for effecting a discrete change in the scale of the converter from a lower scale to a next higher scale, and means connected to said scaling means responsive to a detected minimum digital output of the converter for changing the scale of the converted to lowest scale.

3. In combination, an analog-to-digital converter, an amplifier having an output terminal connected to the input terminal of said converter and adapted to receive an analog signal at its input terminal, said amplifier having a feedback circuit including a discretely variable impedance network for effecting discrete changes of gain of the amplifier, means repetitively operable at successive times for detecting a maximum digital output of said converter, means responsive to each successive detection of a maximum digital output for effecting a discrete change in the impedance of said network from a lower impedance to a next higher impedance, and means responsive to a detected minimum digital output of the converter for changing the impedance of said network to its lowest value.

4. In combination, an analog-to-digital converter, a variable attenuating network having an output terminal connected to the input terminal of said converter and adapted to receive an analog signal at its input terminal, said network having a discretely variable impedance for effecting discrete changes of scale of the converter, means repetitively operable at successive times for detecting a maximum digital output of said converter, means responsive to each successive detection of a maximum digital output for effecting a discrete change in the impedance of said network from a lower value to a next higher value, and means responsive to a detected minimum digital output of the converter for changing the impedance of the network to its lowest value.

5. In combination, an analog-to-digital converter, a scale changer coupled to the input terminal of the analog-to-digital converter and adapted to receive analog input signals to be converted to digital form, a maximum digital output detector and a minimum digital output detector responsive to the output of the analog-to-digital converter, gating means responsive to the maximum digital output detector for transmitting an overflow signal in response to a maximum digital output detected, a counter connected to count the overflow signals of said gating means and connected to be reset by said minimum digital output detector in response to a minimum digital output detected, a scale selector responsive to the count of said counter, and means coupling said scale changer to said scale selector in order that it be controlled by said scale selector.

6. In combination, an analog-to-digital converter having a number of digital output lines of different digital value, a maximum digital output detector comprising a first coincidence gate responsive to a selected combination of said output lines, a clock pulse generator, a second coincidence gate responsive to the generator and the output of the first gate, an OR gate responsive to a group of said output lines of maximum digital value, an inverter responsive to the OR gate, a counter, the output of said inverter being connected to reset the counter, the output of the second coincidence gate being connected to augment the counter, a logic network providing a number of coded output signals, collectively representing the counts of said counter, an input device having a plurality of resistors interposed between the input to the converter and an analog signal to be converted, switches for selectively removing different ones of said resistors from the converter input, and means for operating selected ones of said switches in accordance with the coded output signals of the logic network.

7. The structure of claim 6 wherein the input device comprises an amplifier having said resistors series connected from output to input of the amplifier, said switches being connected in shunt with selected ones of said resistors.

8. The structure of claim 6 wherein the input device comprises a number of resistive networks connected in parallel between the input to the converter and the analog signal to be converted, said switches being connected to ground selected ones of said networks.

9. In combination with an analog-to-digital converter, means for sensing an output of the analog-to-digital converter having a given relation to a pre-determined digital value, an input amplifier having a discretely variable gain connected between the input to said converter and a source of analog signal to be converted, means responsive to said sensing means for causing said amplifier gain to change in discrete steps of like sense for each of a plurality of successive outputs of the analog-to-digital converter having said given relation, a minimum detector responsive to the converter output, and means responsive to said minimum detector for causing said amplifier gain to change to its maximum whereby lowest scale is selected for a selected minimum converter output.

10. In combination with an analog-to-digital converter, means for sensing an output of the analog-to-digital converter having a given relation to a pre-determined digital value, an input amplifier and an attenuating network of discretely variable impedance series connected between the input to said converter and a source of analog signal to be converted, means responsive to said sensing means for causing the impedance of said network to change in discrete steps of like sense for each of a plurality of successive outputs of the analog-to-digital converter having said given relation, a minimum detector responsive to the converter output, and means responsive to said minimum detector for causing said network impedance to change to its lowest value whereby lowest scale is selected for a selected minimum converter output.

References Cited by the Examiner
UNITED STATES PATENTS

| | | | |
|---|---|---|---|
| 2,940,071 | 6/61 | Kindred | 340—347 |
| 2,993,157 | 7/61 | Bradley | 340—347 |
| 3,012,195 | 12/61 | Slocomb et al. | 324—99 |

MALCOLM A. MORRISON, *Primary Examiner.*